US009995211B2

(12) United States Patent
Schmit et al.

(10) Patent No.: US 9,995,211 B2
(45) Date of Patent: Jun. 12, 2018

(54) ELECTRICAL GENERATOR ASSEMBLY

(71) Applicant: Champion Engine Technology, LLC, Sussex, WI (US)

(72) Inventors: Ian Schmit, Cedarburg, WI (US); Leigh Jenison, Hartland, WI (US); Aleko D. Sotiriades, Cedarburg, WI (US); Mark J. Sarder, Waukesha, WI (US)

(73) Assignee: Champion Engine Technology, LLC, Sussex, WI (US)

(*) Notice: Subject to any disclaimer, the term of this patent is extended or adjusted under 35 U.S.C. 154(b) by 365 days.

(21) Appl. No.: 14/677,620

(22) Filed: Apr. 2, 2015

(65) Prior Publication Data

US 2016/0294255 A1    Oct. 6, 2016

(51) Int. Cl.
*H02G 3/08* (2006.01)
*F02B 63/04* (2006.01)

(52) U.S. Cl.
CPC ............ *F02B 63/04* (2013.01); *F02B 63/044* (2013.01); *Y02T 10/16* (2013.01)

(58) Field of Classification Search
CPC ...... H01R 13/53; H01R 13/533; H01R 13/46; H01R 13/52; H02G 3/08; H02G 3/081; F02B 63/04; F02B 63/044; H05K 5/00; H05K 5/03; H05K 5/0004; H05K 5/02; H05K 5/04; H02K 5/00; H02K 5/04; H02K 5/10; Y02T 10/16

USPC ......... 174/50, 559, 520, 17 R; 361/600, 601, 361/602, 603, 641, 679.01; 310/89
See application file for complete search history.

(56) References Cited

U.S. PATENT DOCUMENTS

| 7,642,665 | B2  | 1/2010 | Konop et al. |
| 7,902,705 | B2  | 3/2011 | Gravlin et al. |
| 8,143,755 | B2* | 3/2012 | Gravlin ................... F02B 63/04 290/1 A |
| 8,960,708 | B2* | 2/2015 | Ziebert ................. F02B 63/044 290/1 A |
| 9,431,865 | B2* | 8/2016 | Janscha ................... F02B 63/04 |
| 9,554,482 | B2* | 1/2017 | Wilson ..................... H05K 5/03 |

FOREIGN PATENT DOCUMENTS

CN            104314676 A        1/2015

* cited by examiner

*Primary Examiner* — Angel R Estrada
(74) *Attorney, Agent, or Firm* — Ziolkowski Patent Solutions Group, SC

(57) ABSTRACT

An enclosure for a standby generator includes a frame having a base for supporting an engine and an alternator driven by the engine, a back wall extending generally vertically from the base, and first and second sidewalls extending generally vertically from the base and connected to the back wall at opposite ends of the enclosure, the first and second sidewall each having a top edge, generally sloping downward from the back wall forward. The enclosure also includes first and second doors, each respectively attached to the first and second sidewalls of the frame such that each pivots about the top edge of the first and second sidewalls.

25 Claims, 10 Drawing Sheets

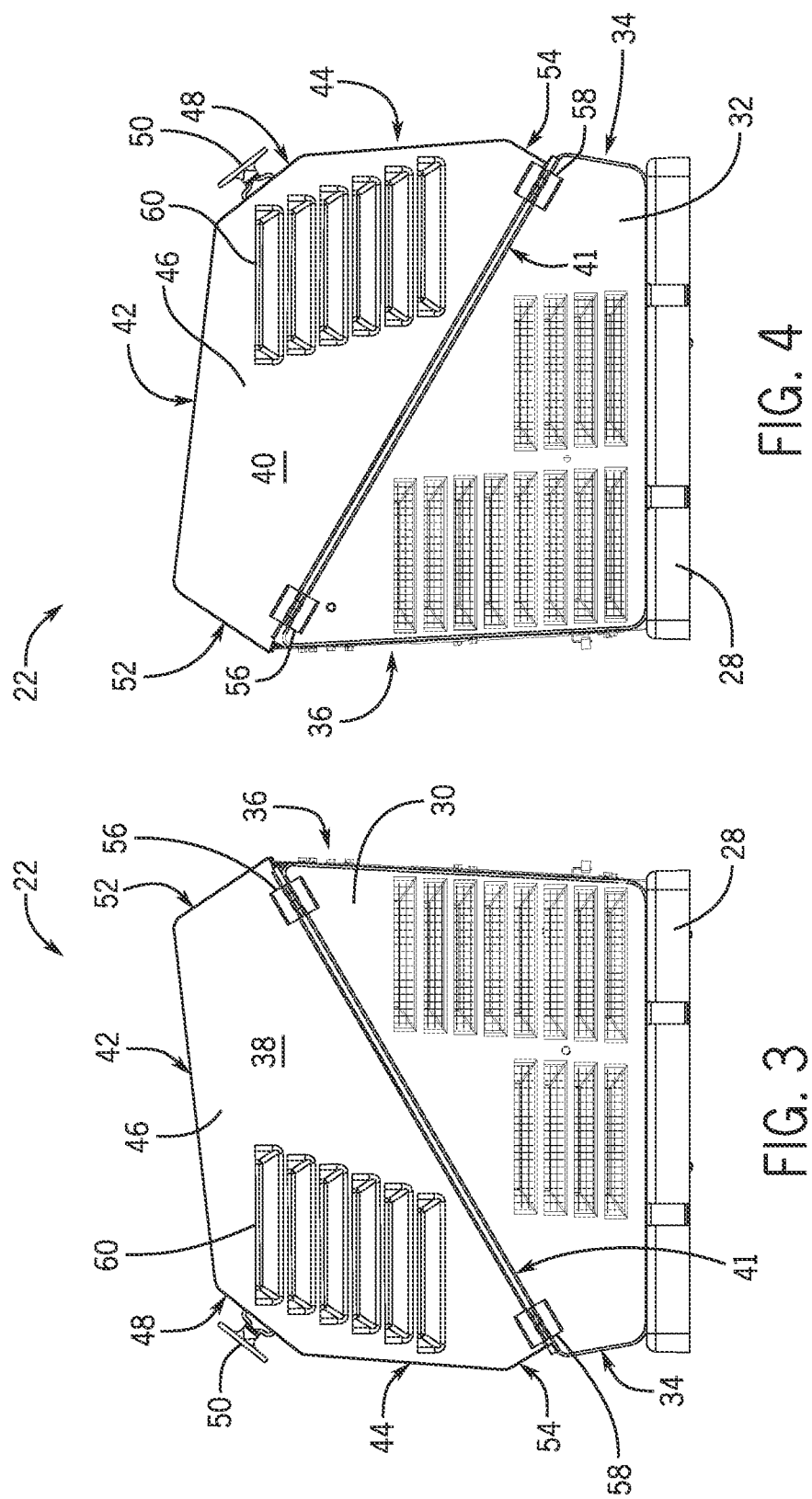

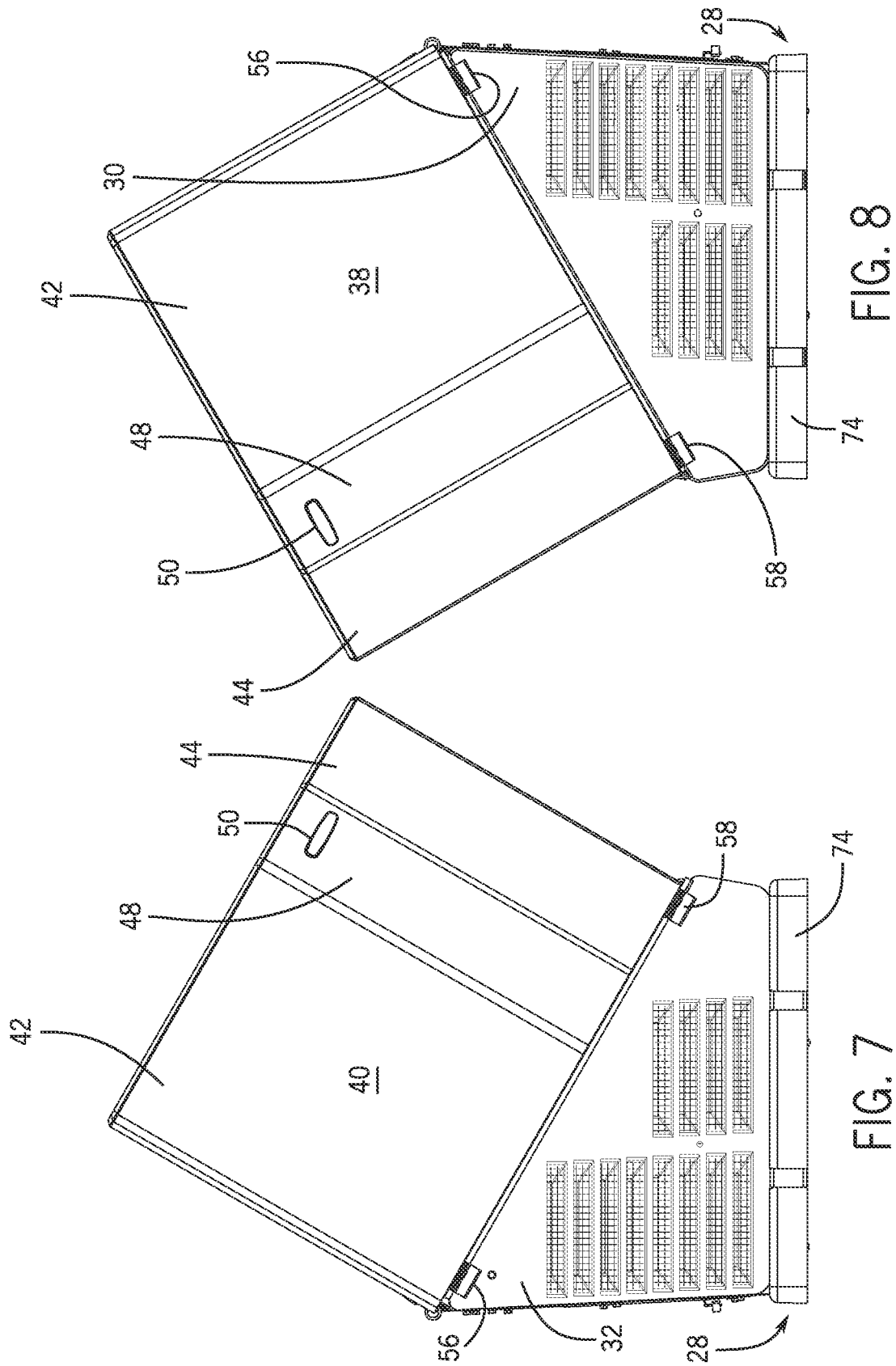

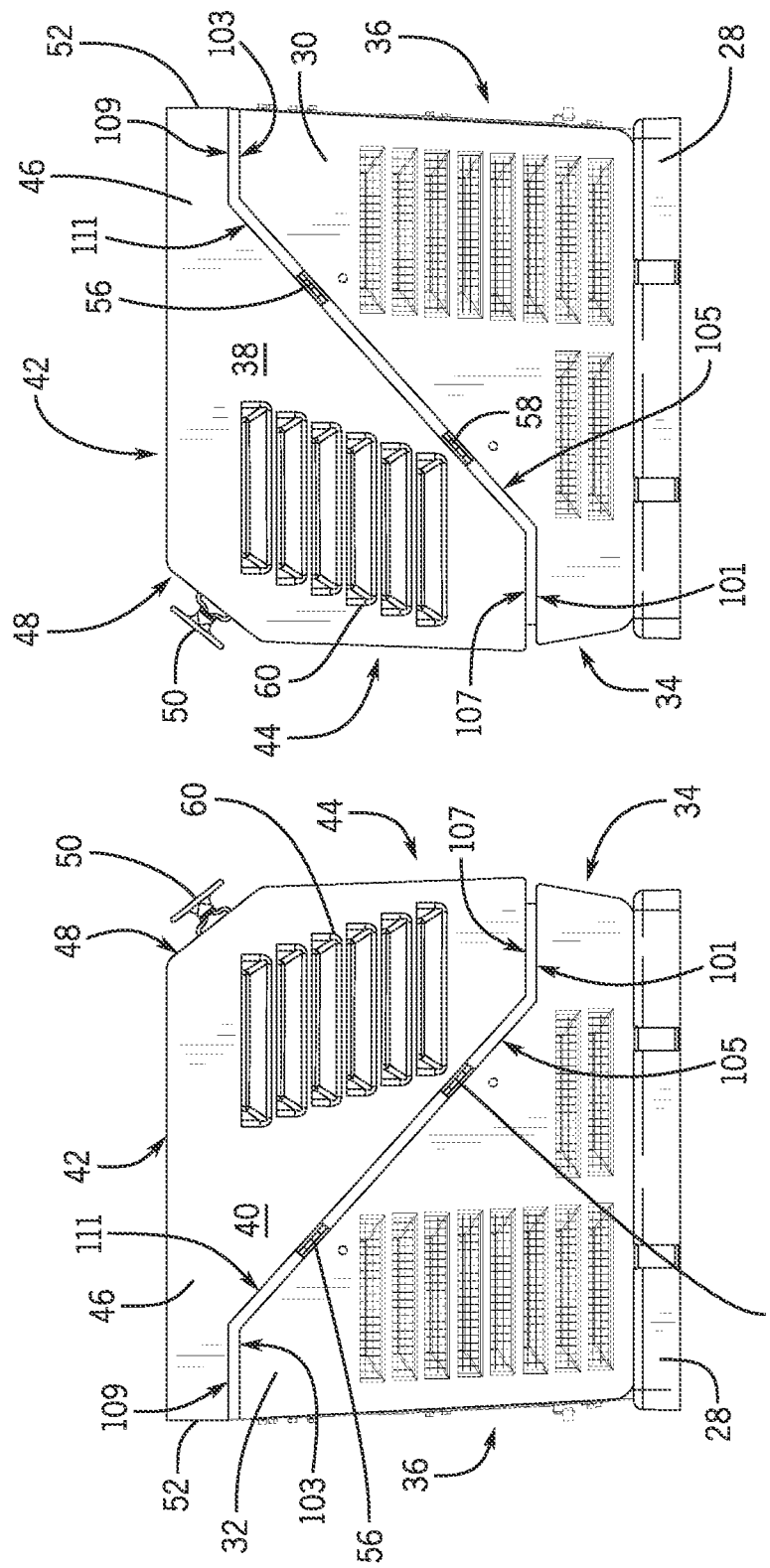

ELECTRICAL GENERATOR ASSEMBLY

BACKGROUND OF THE INVENTION

Embodiments of the invention relate generally to standby generators and, more particularly, to a standby generator having an enclosure with improved access and serviceability.

Standby generators provide a convenient source of backup power when outages occur in the utility grid. Standby generators may contain a prime mover coupled to a generator to produce electricity. The prime mover often comprises an internal combustion engine configured to operate on natural gas or propane, but can also include operation with diesel, gasoline, or any other available fuel. The generator often comprises an alternator configured to produce electricity for distribution to an electrical panel of a home or building.

Standby generators are typically contained in an enclosure to house the internal combustion engine, alternator, control system and other generator components. The enclosure may protect the generator from the weather and provide insulation against noise produced by the generator. Standby generators have a means of access into the enclosure for servicing the generator and operating the controls. Unfortunately, some standby generators do not provide easy access through the front of the enclosure making servicing many components difficult. Also, standby generators are often placed adjacent a wall of a home or building which may limit the degree to which some enclosures can be opened. Further, damage to the generator and electrical hazards may result if the access means allows rain water to enter the enclosure and contact the electrical components.

Therefore, it would be desirable to design an apparatus and method for a standby generator that provides improved access. It would be further desirable to provide an enclosure with improved containment of the generator for weather protection and noise reduction.

BRIEF DESCRIPTION OF THE INVENTION

In accordance with one aspect of the invention, an enclosure for a standby generator includes a frame having a base for supporting an engine and an alternator driven by the engine, a back wall extending generally vertically from the base, and first and second sidewalls extending generally vertically from the base and connected to the back wall at opposite ends of the enclosure, the first and second sidewall each having a top edge, generally sloping downward from the back wall forward. The enclosure also includes first and second doors, each respectively attached to the first and second sidewalls of the frame such that each pivots about the top edge of the first and second sidewalls.

In accordance with another aspect of the invention, a standby generator includes a multi-chamber generator housing having a base, a back wall, a first and second sidewall at a respective first end and second end of the housing, and a first and second partition wall each extending from the back wall to the front of the housing to create respective chambers, both partition walls having at least one aperture for air to flow between the respective chambers. The standby generator also includes an internal combustion engine and an alternator driven by the internal combustion engine mounted in the housing between the first and second partition walls. The standby generator further includes a first and second hood each rotatively coupled to a different one of the first and second sidewall such that the first and second hoods rotate between a closed position to substantially cover front and top ends of the housing, and an open position where the front and top ends of the housing are substantially open to provide access into the housing.

In accordance with another aspect of the invention, a generator includes a frame having a base, two sidewalls extending from the base, a back wall extending from the base, and a front portion along the front of the base, wherein the front portion and the sidewalls define a front opening into the generator, the back wall and the sidewalls define a top opening into the generator, the back wall has a height greater than that of the front portion and each sidewall has a back height substantially similar to that of the back wall and a front height mating to the front portion of the frame, and a top edge of each sidewall extends downward from the back height of the respective sidewall to the front height of the respective sidewall. The generator also includes a prime mover and an alternator mounted within the frame. The generator further includes first and second doors rotatively coupled to a respective sidewall to rotate over a top of the respective sidewall between a closed position to substantially cover the top and front openings and an open position to provide access into the generator through the top and front openings.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings:

FIG. 3 is a right side view of the electrical generator of FIG. 1.

FIG. 4 is a left side view of the electrical generator of FIG. 1.

FIG. 7 is a left side view of FIG. 5 with the left door opened.

FIG. 8 is a right side view of FIG. 5 with the right door opened.

FIG. 11 is a left side view of the electrical generator of FIG. 10.

FIG. 12 is a right side view of the electrical generator of FIG. 10.

DETAILED DESCRIPTION OF THE PREFERRED EMBODIMENTS

Figure 1:
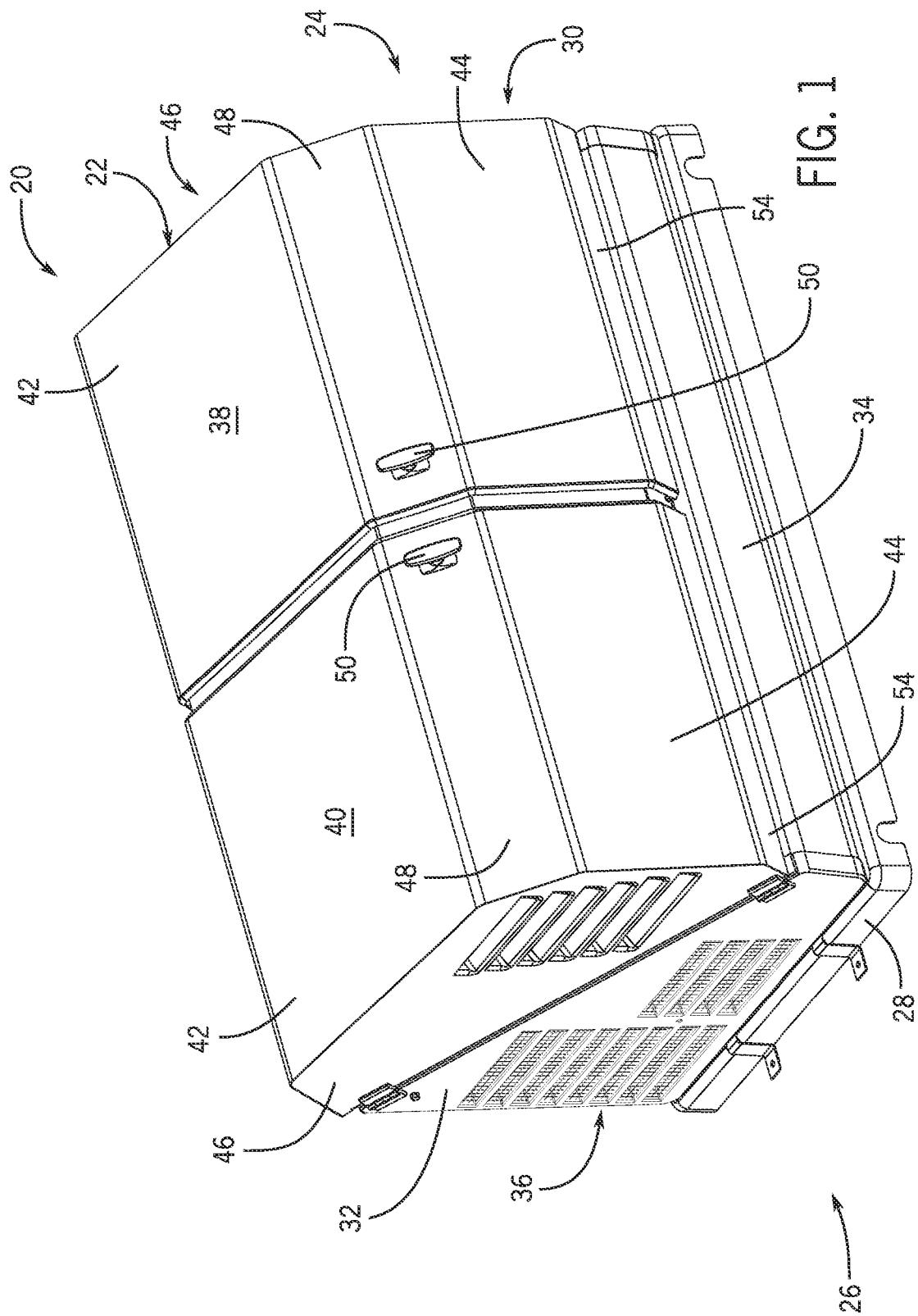
FIG. 1 is a perspective view from the left upper side of an electrical generator according to an embodiment of the present invention.

Referring to FIG. 1, a standby generator 20 is shown, in accordance with an embodiment of the invention. The standby generator 20 produces electrical energy and may deliver the electrical energy to a distribution panel of a home, office, shop, business, or any other building requiring electricity. The standby generator 20 may include an internal combustion engine, an alternator driven by the internal combustion engine, and other associated components. The standby generator 20 includes an enclosure 22 to house the alternator, internal combustion engine, and other associated components. In the embodiment of FIG. 1, the engine and alternator are coupled together in a horizontal shaft arrangement with the engine located toward a first end 24 of the enclosure 22 and the alternator located toward a second end 26 of the enclosure 22.

The enclosure 22 has a base 28 for supporting the engine and alternator. The enclosure 22 has a first sidewall 30 extending vertically from the base 28 at the first end 24 and a second sidewall 32 extending vertically from the base 28 at the second end 26, each preferably having vents therein. A front wall 34 and a back wall 36 extend generally vertically from the base 28 between the first sidewall 30 and second sidewall 32. The front wall 34 may be angled slightly from vertical with the bottom edge positioned inward from the top edge. The enclosure 22 may also have one or more doors or hoods to cover the standby generator 20. In one embodiment, the enclosure 22 has a first door 38 and a second door 40 to cover the standby generator 20.

Figure 5:
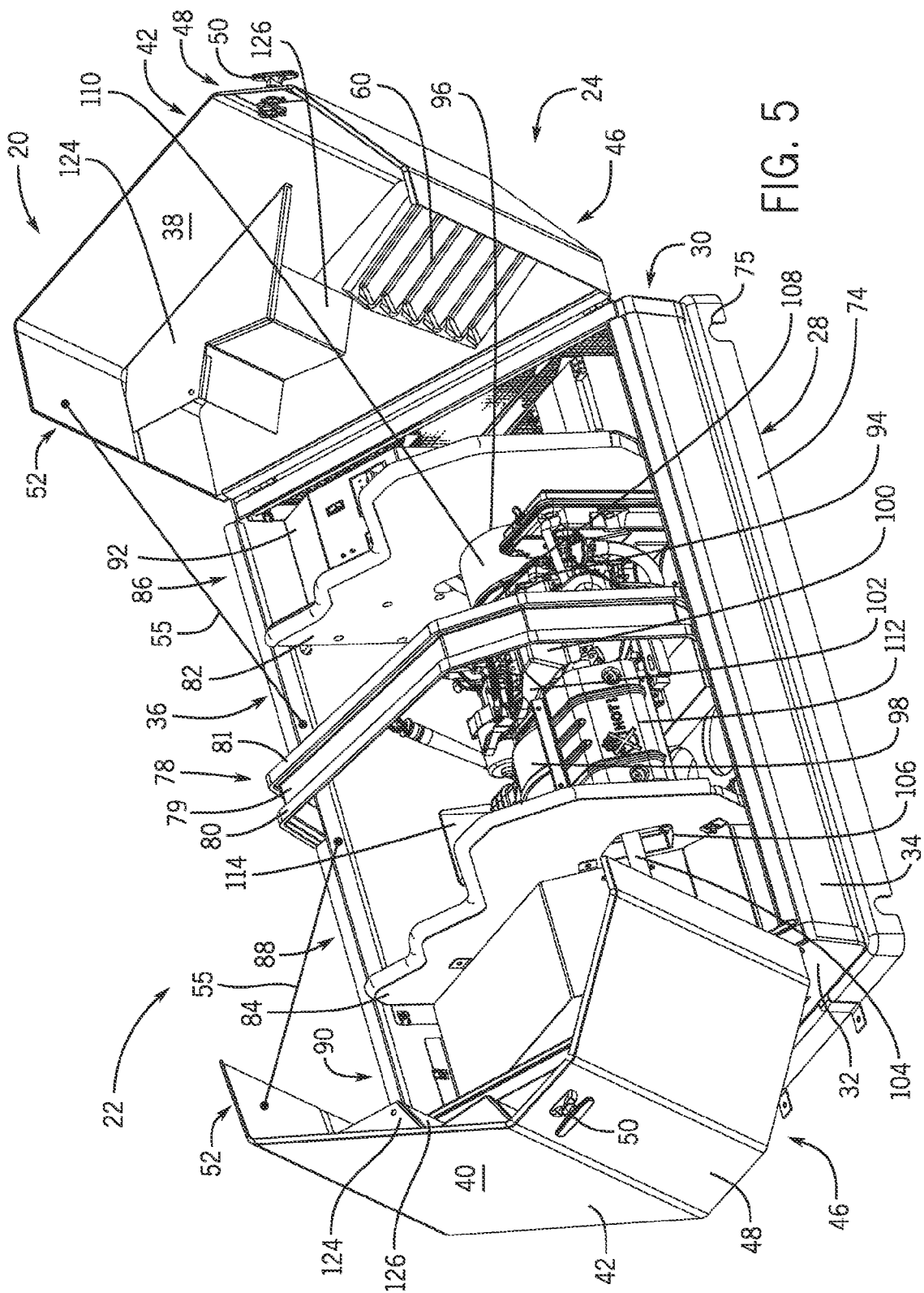
FIG. 5 is a perspective view similar to FIG. 1 with left and right doors opened to expose the electrical generator components within.

The first door 38 and the second door 40 each have a top panel 42, a front panel 44 and a side panel 46 generally perpendicular to the top and front panels. The top panel 42 preferably slopes downward to the front of the enclosure 22 and the front panel 44 may slope forward to the base 28 of the enclosure 22 to enhance water runoff. The doors may also have a front transition panel 48 between the top panel 42 and the front panel 44. The front transition panel 48 further encourages water runoff and adds to an aesthetically pleasing design. A handle 50 is attached to the front transition panel 48 of each door 38, 40 for opening the doors and exposing the internal components as shown in FIG. 5. Referring back to FIG. 1, the front transition panel 48 is designed so the handles are directionally facing a person standing in front of the enclosure 22 when the doors are closed to enhance easy accessibility.

Figure 2:
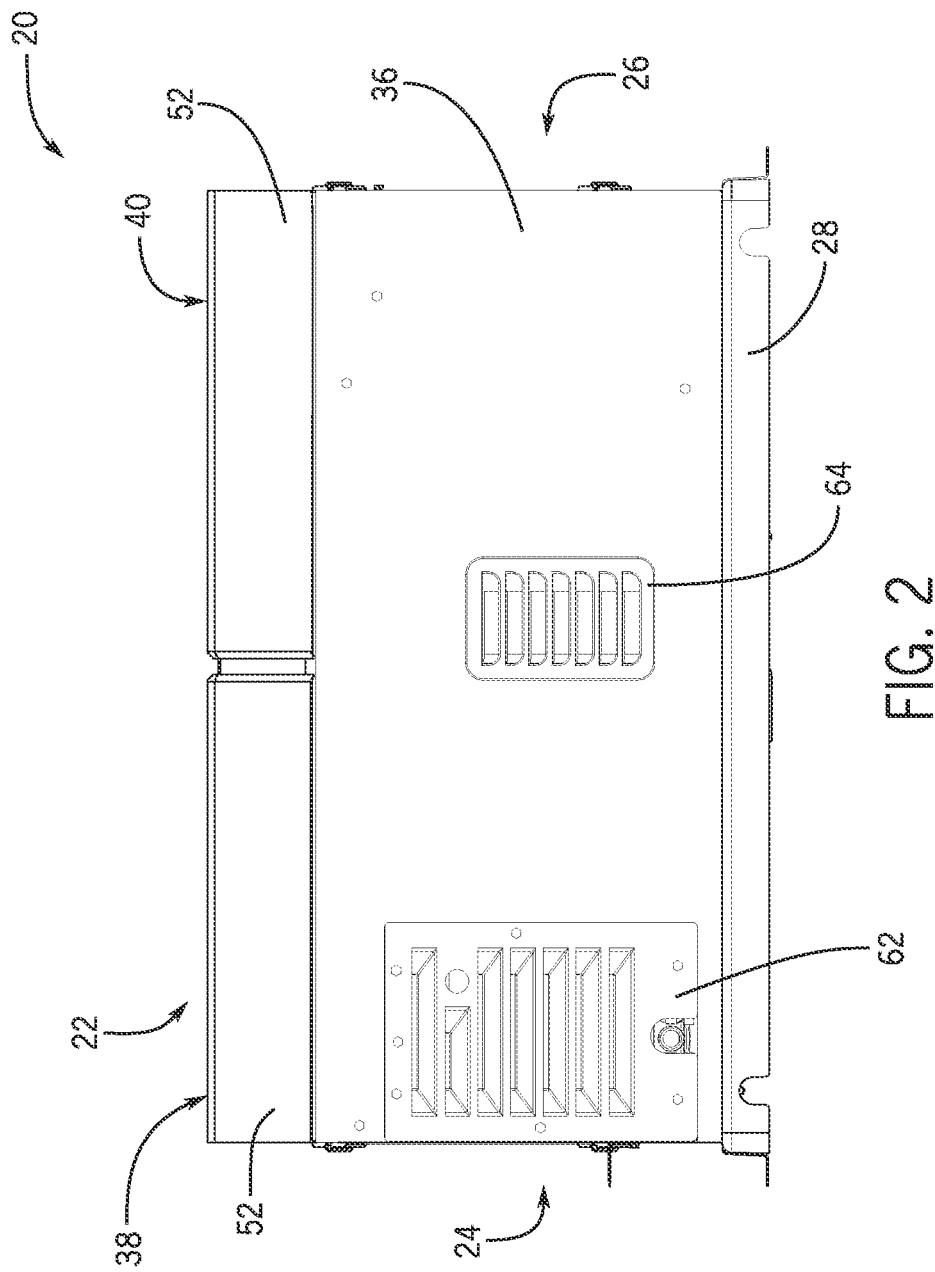
FIG. 2 is a rear view of the electrical generator of FIG. 1.

Referring now to FIG. 2, a rear view of the electrical generator of FIG. 1 is shown, according to an embodiment of the invention. The back wall 36 has vents located within a removable panel 62 located near the first end 24. The removable panel 62 may provide access to electrical wires of a control system. The back wall 36 may also have vents located in a second panel 64 near the middle of the enclosure 22 that leads to an air duct to supply cooling air to power train components.

FIGS. 3 and 4 show right and left sides, respectively, of the embodiment described with respect to FIG. 1. The front wall 34 is relatively short compared to the overall height of the enclosure 22 to allow for greater access into the enclosure 22 when the doors are open. The back wall 36 may be relatively tall compared to the front wall 34. The first sidewall 30 and second sidewall 32 have a top edge 41 that generally slopes diagonally from a taller back wall 36 to a shorter front wall 34.

The first door 38 and second door 40 are hingedly attached to a respective one of the first sidewall 30 and second sidewall 32. Each side panel 46 has a first hinge 56 and a second hinge 58 that couples to the respective sidewall with the first hinge 56 near the back of the enclosure 22 and the second hinge 58 near the front of the enclosure 22. The first door 38 and the second door 40 open upward and slightly forward as they rotate along the upper edge of the respective first sidewall 30 and second sidewall 32 as shown in FIGS. 5-8. Accordingly, the first door 38 and the second door 40 open outwards beyond respective first sidewall 30 and second sidewall 32 to expose the top and front ends of the enclosure 22. That is, the first door 38 and the second door 40 swing over the top of the respective first sidewall 30 and second sidewall 32 such that they do not block the top and front ends of the enclosure 22. In other embodiments of the invention, the first sidewall 30 and second sidewall 32 may have an upper edge that is horizontal and the first door 38 and second door 40 may open upwards as they rotate along the upper edge and over the respective sidewalls.

The top panel 42 and the side panel 46 extend above the back wall 36 of the enclosure. The doors 38, 40 have a rear transition panel 52 that slopes rearward from the top panel 42 to the back wall 36 when the doors are closed. The lower edge of the front panel 44 may extend outwards beyond the front wall 34. The doors have a lower panel 54 that slopes inward from the front panel 44 to the front wall 34 when the doors are closed.

The first door 38 and the second door 40 have vents 60 in each respective side panel 46 to allow airflow into and out of the enclosure 22. In the embodiment described with reference to FIG. 1, air flows from the right side, first end 24 to the left side, second end 26. FIG. 3 shows the right air intake side and FIG. 4 shows the left air exhaust side. Vents may also be located in the first sidewall 30, the second sidewall 32 and the back wall 36 and the vents may also comprise louvers with screens covering the louvers.

Referring now to FIG. 5, a standby generator 20 is shown with its doors in an open position, in accordance with an embodiment of the invention. The enclosure 22 may have door stops 55 which may comprise lanyards or cables that prevent the first door 38 and second door 40 from opening past a defined angle. In one embodiment of the invention, the stops hold the door open at 105 degrees from the closed position. The first door 38 and second door 40 may open to the sides of the enclosure in a "gull wing" configuration for ease of access and serviceability to the generator. The "gull wing" configuration may provide access into the enclosure 22 through the front and top, and the configuration may allow the doors to open without contacting a home, office, shop, business, or any other building requiring electricity located behind the generator.

The enclosure 22 may also have a support arm 78 to support the first door 38 and the second door 40 when the doors are in the closed position. The support arm 78 may extend over the top of the enclosure 22 from the back wall 36 to the front wall 34 in the center of the enclosure 22. The support arm 78 may extend above the back wall 36 and may have a geometry that corresponds to the geometry of the doors that rest on the support. The support arm 78 may also receive a latch from each handle 50 to hold the doors closed. The support arm 78 has a channel or gutter 79 to channel rain water away. Support arm 78 also has first and second rain seals 80, 81 attached thereto that preferably run the length of the support arm 78. The doors 38, 40 mate against the support arm 78 and seals 80, 81 on its upper surface along its length. Rain seals may also extend around the perimeter of the entrance covered by the doors. The rain seals 80, 81 may prevent rain from entering the enclosure 22 and may make the enclosure 22 rain tight. Although some water may enter the enclosure 22 without negatively affecting the generator, it is desirable to prevent water from entering the electrical areas within the enclosure 22. As such, the electrical areas within the enclosure 22 may be rain tight.

The standby generator 20 may include a first partition wall 82 and a second partition wall 84 separating the enclosure 22 into three chambers. A controls chamber 86 may be located between the first sidewall 30 and the first partition wall 82. A power train chamber 88 may be located between the first partition wall 82 and second partition wall 84. An exhaust chamber 90 may be located between the second partition wall 84 and the second sidewall 32.

The first door 38 and second door 40 may have partitioning panels 124 that correspond with the first partition wall 82 or second partition wall 84 of the enclosure 22. The partitioning panels 124 may seal off the chambers with the partition walls 82, 84. The partitioning panels 124 may extend from the rear transition panel 52 to the top panel 42 short of the front transition panel 48. The first partition wall 82 and second partition wall 84 of the enclosure 22 may extend upward in front of the partitioning panels 124 to contact the top panel 42 of the doors. In one embodiment of the invention, the partitioning panels 124 have a zigzag geometry corresponding to geometry of the partition walls 82, 84. The partitioning panels 124 may provide structural support to the doors, and support panels 126 may couple to the partitioning panels 124 and to a respective side panel 46. The support panels 126 may mate flush with the lower edge of the partitioning panels 124.

The controls chamber 86 may be located at the first end 24 of the enclosure 22 and houses components of a control system 92. The control system 92 may include electrical components for operating the generator and for delivering electrical energy to a distribution panel of a home, office, shop, business, or any other building requiring electricity. The controls chamber 86 may also serve as an intake compartment for the enclosure 22 by receiving ambient air from the environment. The ambient air may be used to cool the control system 92 and to operate the engine. In one embodiment, the chamber walls or the first door 38 has vents 60 for receiving the ambient air. Airflow through the vents 60 may be generated by a fan located in the controls chamber 86. A prime mover, such as an engine 94, may draw air from the controls chamber 86 through an opening 96 in the first partition wall 82, and the air flow generated by the engine 94 may also pull air into the controls chamber 86 from the environment. The controls chamber 86 also insulates noise from the engine 94 that emanates through the opening 96 in the first partition wall 82.

The power train chamber 88 may house the engine 94 and an alternator 98 driven by the engine 94. The engine 94 includes a cylinder block containing one or more cylinders with a corresponding piston slidably positioned within each cylinder. A cylinder head sits on the cylinder block and has an intake port and an exhaust port for each cylinder. Each cylinder receives a fuel and air mixture through its intake port which is compressed and ignited causing reciprocal motion of the pistons. The reciprocal motion of the pistons is translated into rotational motion by a crankshaft. The exhaust gas following combustion is expelled from the cylinders through a respective exhaust port.

The cylinder block and cylinder head may each have cooling fins located around their periphery to dissipate heat generated during combustion. The engine 94 may have engine covers comprising a cylinder head cover 100 and a cylinder block cover 102 mounted to the engine 94 to enclose the fins. The engine covers may have a first opening facing the controls chamber 86 and a second opening facing the exhaust chamber 90 to provide a respective inlet and an outlet for cooling air to flow within the covers and over the fins. The exhaust ports may face the cooling air outlet so that an exhaust system 104 may couple to the ports and extend from the cylinder head through the outlet. The exhaust system 104 may pass through a first opening 106 in the second partition wall 84 to deliver exhaust following combustion to the exhaust chamber 90.

The engine 94 may have an engine fan 108 to pull air into the power train chamber 88 and cool the engine 94. The engine fan 108 may be driven by the crankshaft and located on the opposite side of the engine 94 from the alternator 98. The engine fan 108 may face an opening 96 in the first partition wall 82 to pull air into the power train chamber 88 from the controls chamber 86. The engine fan 108 may also be positioned within the opening 96 in the first partition wall 82 and a shroud 110 may be coupled to the first partition wall 82 to define the opening 96 and surround the engine fan 108. The engine fan 108 may drive cooling air through the engine covers and over the cooling fins and then out of the power train chamber 88 through a first opening 106 in the second partition wall 84.

The power train chamber 88 may also include a heat duct 112 positioned around the exhaust system 104 and extending from the engine 94 to the first opening 106 in the second partition wall 84. The heat duct 112 may be located adjacent the engine covers at the cooling air outlet so that cooling air can be funneled between the heat duct 112 and the exhaust system 104. The heat duct 112 may direct the expelled cooling air from the engine 94 out of the power train chamber 88 through the first opening 106 in the second partition wall 84. The heat duct 112 may also direct air to cool the exhaust and provide a heat shield around the exhaust to reduce heat transfer from the exhaust system 104 into the power train chamber 88. Accordingly, the heat duct 112 may reduce air temperature within the power train chamber 88 so that the generator operates at cooler temperatures and higher efficiency.

An alternator 98 may also be positioned within the power train chamber 88 and driven by the crankshaft to generate electrical energy for distribution from the standby generator 20. The alternator 98 may have a housing with an opening coupled to an air duct 114 that provides cooing air to the alternator 98. The air duct 114 may extend from the alternator housing to an opening in the back wall 36 of the enclosure.

Figure 6:
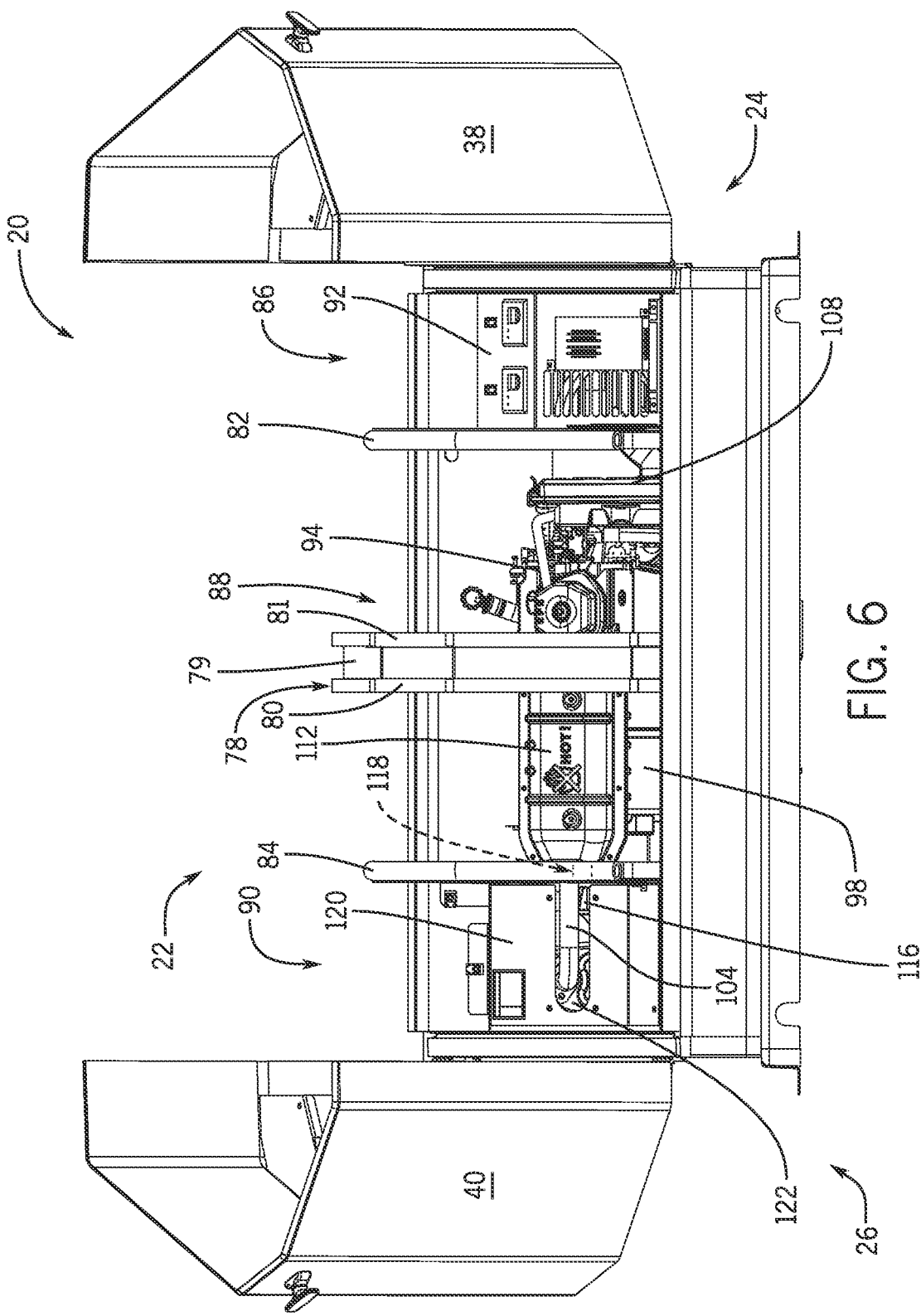
FIG. 6 is a front elevational view of FIG. 5 with left and right doors opened.

Referring now to FIG. 6, a front elevational view of FIG. 5 with left and right doors opened is shown, according to an embodiment of the invention. The alternator 98 may have an exhaust fan 116 driven by a common shaft and located on the opposite side of the alternator 98 from the engine 94. The exhaust fan 116 may draw environmental air into the air duct 114 (FIG. 5) and axially through the alternator 98. The air expelled from the alternator may exit the power train chamber 88 through a second opening 118 in the second partition wall 84.

The exhaust chamber 90 may be located at the second end 26 of the enclosure 22 and may receive exhaust from the engine 94 and alternator 98 and expels exhaust to the environment. The exhaust system 104 may extend into the exhaust chamber 90 through a first opening 106 (FIG. 5) in the second partition wall 84. The exhaust chamber 90 may have a muffler box 120 that houses a muffler 122 for the exhaust system 104. The muffler box 120 may protect an operator at the front of the enclosure 22 from exhaust gas when the first door 38 and the second door 40 are open. The muffler box 120 may be located behind the first opening 106 (FIG. 5) in the second partition wall 84 so that the exhaust system 104 makes a 90 degree bend before entering the muffler box 120. Accordingly, expelled cooling air from the heat duct 112 may be directed past the muffler box 120 and straight out of the exhaust chamber 90 through vents 60 provided in the second door 40 (FIG. 4). The exhaust fan 116 may also be located in the exhaust chamber 90 and may couple to the alternator 98 through the common shaft that extends through a second opening 118 in the second partition wall 84. The expelled cooling air from both the alternator 98 and engine 94 and combustion gases from the engine 94 may dissipate within the exhaust chamber 90 before expelling the exhaust safely to the environment. The exhaust chamber 90 also provides insulation against noise from the exhaust fan 116 and against noise that emanates through the first opening 106 (FIG. 5) and second opening 118 in the second partition wall 84.

In accordance with an exemplary embodiment of the invention, the engine 94 and the alternator 98 have a horizontal shaft arrangement with the engine 94 positioned toward the first end 24 of the enclosure 22 and the alternator 98 positioned toward the second end 26 of the enclosure 22. The engine fan 108 may be located upstream from the engine 94 and the alternator 98 and drives cooling air from the controls chamber 86 over the engine 94 through the heat duct 112 and into the exhaust chamber 90. The exhaust fan 116 may be located downstream from the engine 94 and the alternator 98 and draws cooling air through the alternator 98 and then expels the air into the exhaust chamber 90. The heat duct 112 may also direct expelled cooling air from the engine 94 into the exhaust chamber 90 so that it bypasses the exhaust fan 116 allowing for a reduction in fan size and power consumption.

FIG. 7 shows a left side view of FIG. 5 with the second door 40 opened, and FIG. 8 shows a right side view of FIG. 5 with the first door 38 opened, according to an embodiment of the invention.

Figure 9:
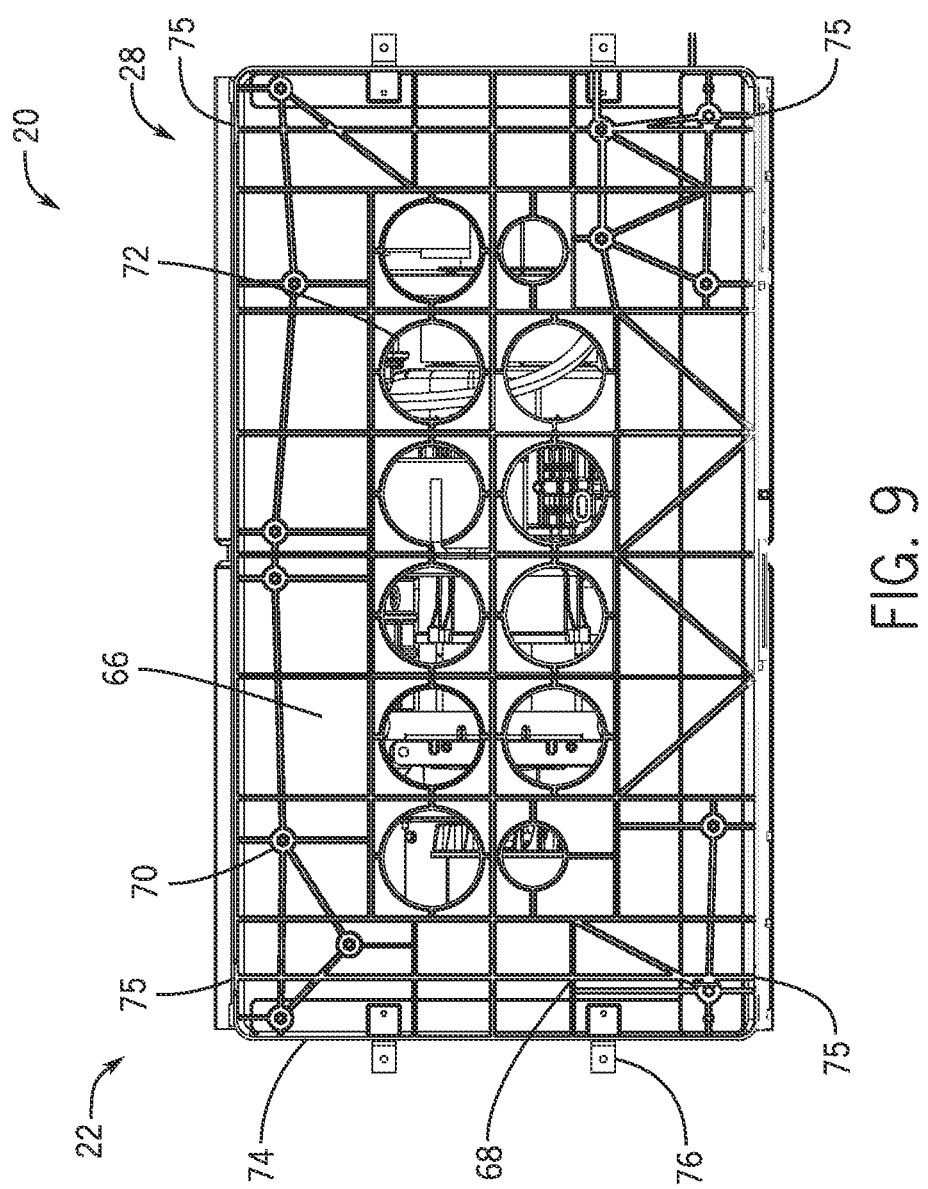
FIG. 9 is a bottom view of the electrical generator of FIG. 1.

Referring now to FIG. 9, the base 28 of the enclosure is shown from below, according to an embodiment of the invention. The base 28 may comprise an upper platform 66 raised off the ground by a network of support beams 68. The support beams 68 may extend lengthwise, crosswise, or diagonally along the base 28. The support beams 68 may join together to create mounting locations 70 for the enclosure walls or other generator components. The mounting locations 70 may have openings for fasteners. The base 28 may also contain openings 72 under the generator components. The openings 72 may provide access to the underside of the upper platform 66 to reach fasteners for the generator components.

The base 28 may also have support walls 74 extending around the periphery. A pair of openings 75 may be provided in the front support wall and a corresponding pair of openings 75 may be provided in the back support wall. Lifting straps may be threaded through the openings 75 and wrapped around the enclosure 22. Water may also be expelled from under the enclosure 22 through the openings 75. The side support walls may each have a pair of brackets 76 to mount the standby generator 20 to a foundation on the ground.

Figure 10:
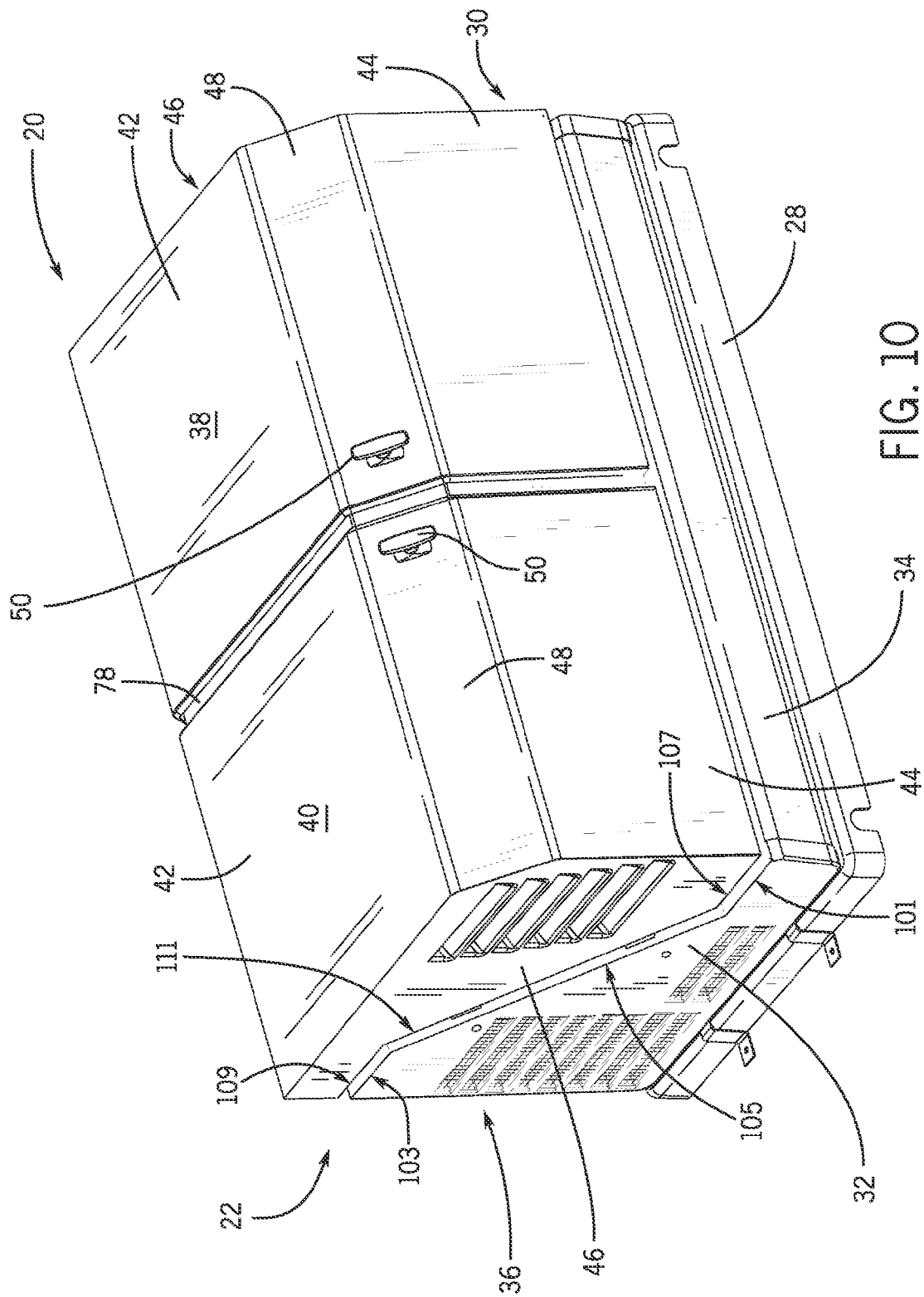
FIG. 10 is a perspective view from the left upper side of an electrical generator according to another embodiment of the present invention.

Referring now to FIG. 10, a perspective view from the left upper side of an electrical generator is shown, according to another embodiment of the present invention. The standby generator 20 may have a front wall 34 that is shorter than a back wall 36, and a first sidewall 30 and second sidewall 32 at corresponding ends of the enclosure 22. The first sidewall 30 and second sidewall 32 may have an upper edge in a "Z" shape or modified "Z" shape. That is, the first sidewall 30 and second sidewall 32 may each have a horizontal component 101 in the front corresponding to the height of the front wall 34 and a horizontal component 103 in the rear corresponding to the height of the back wall 36. The sidewalls 30, 32 may also have a forward sloping top edge 105 connecting the two horizontal components 101, 103. The support arm 78 may slope downward from the top of the back wall 36 across the top of the enclosure 22.

The standby generator 20 may also have a first door 38 and a second door 40 hingedly connected to a respective first sidewall 30 or second sidewall 32. In the embodiment where the first sidewall 30 and second sidewall 32 have the "Z" shape or modified "Z" shape, the first door 38 and second door 40 may also have the "Z" shape or modified "Z" shape to correspond with the first sidewall 30 or second sidewall 32. That is, the lower edge of each door's side panel 46 may have a horizontal component 107 in the front corresponding to the height of the front wall 34 and a horizontal component 109 in the rear corresponding to the height of the back wall 36. The lower edge of each side panel 46 may also have a diagonal component 111 connecting the two horizontal components.

FIG. 11 is a left side view of the electrical generator of FIG. 10, and FIG. 12 is a right side view of the electrical generator of FIG. 10, according to an embodiment of the invention. The first door 38 and the second door 40 may be coupled to the respective first sidewall 30 and second sidewall 32 by a first hinge 56 and a second hinge 58 located along the angled top surfaces of first and second sidewalls 30, 32. The doors may have a front panel 44 and a rear transition panel 52 that are substantially perpendicular to the ground and a top panel 42 that is substantially parallel to the ground.

Figure 13:
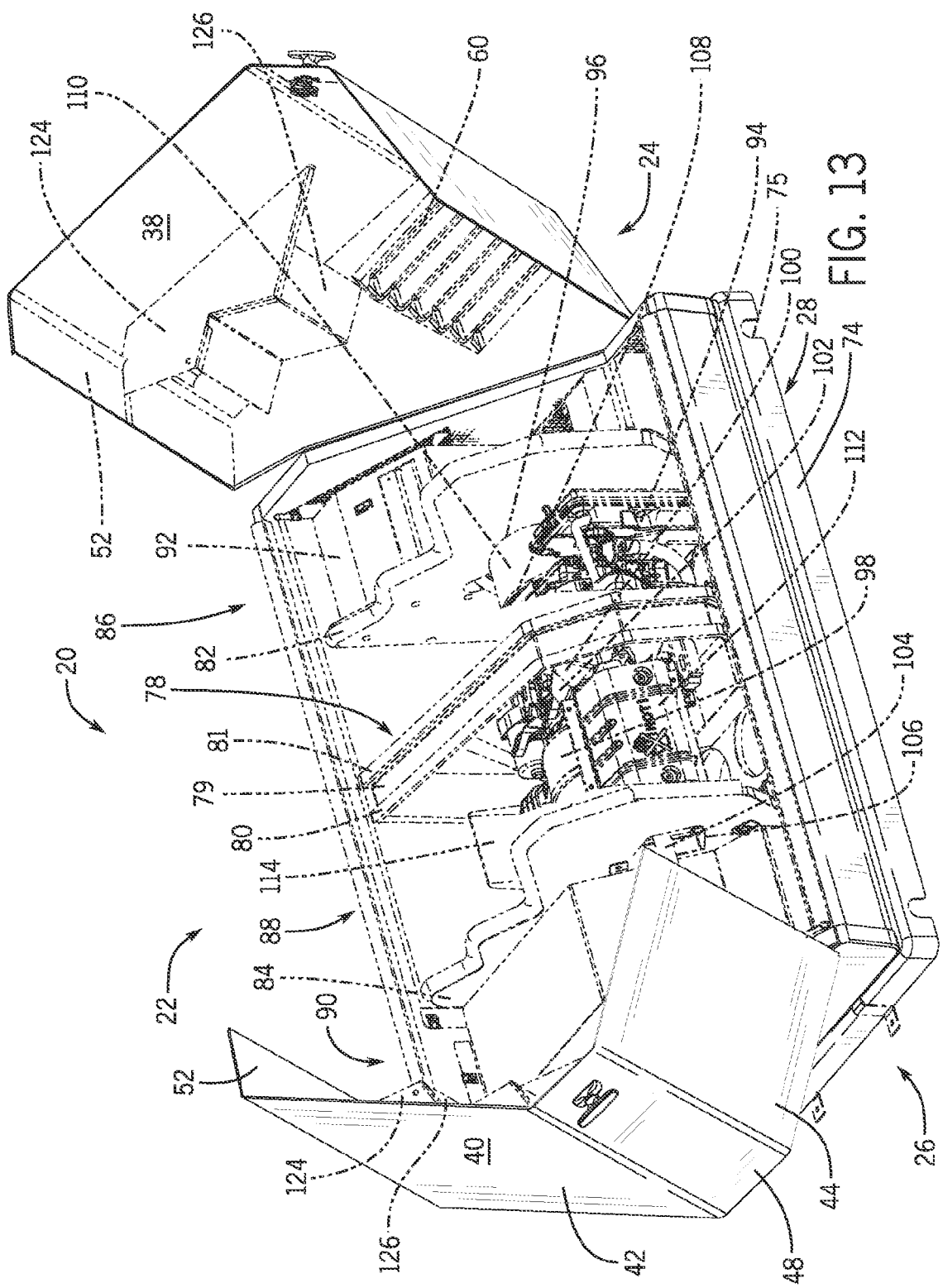
FIG. 13 is a perspective view similar to FIG. 10 with left and right doors opened to expose the electrical generator components within.

Referring now to FIG. 13, a perspective view similar to FIG. 10 shows left and right doors opened to expose the electrical generator components within, according to an embodiment of the invention. The first door 38 opens past the first end 24 of the enclosure 22 and the second door 40 opens past the second end 26 of the enclosure 22.

Beneficially, the design of the enclosure includes a "gull wing" door configuration as described herein. This design provides improved access into the enclosure to service the standby generator. The configuration also allows the generator to be serviced without the doors held open above the operator thus improving safety for the operator. The "gull wing" door configuration also provides for improved containment of the generator within the enclosure for weather protection and noise reduction.

Therefore, according to one embodiment of the invention, an enclosure for a standby generator includes a frame having a base for supporting an engine and an alternator driven by the engine, a back wall extending generally vertically from the base, and first and second sidewalls extending generally vertically from the base and connected to the back wall at opposite ends of the enclosure, the first and second sidewall each having a top edge, generally sloping downward from the back wall forward. The enclosure also includes first and second doors, each respectively attached to the first and second sidewalls of the frame such that each pivots about the top edge of the first and second sidewalls.

According to another embodiment of the invention, a standby generator includes a multi-chamber generator housing having a base, a back wall, a first and second sidewall at a respective first end and second end of the housing, and a first and second partition wall each extending from the back wall to the front of the housing to create respective chambers, both partition walls having at least one aperture for air to flow between the respective chambers. The standby generator also includes an internal combustion engine and an alternator driven by the internal combustion engine mounted in the housing between the first and second partition walls. The standby generator further includes a first and second hood each rotatively coupled to a different one of the first and second sidewall such that the first and second hoods rotate between a closed position to substantially cover front and top ends of the housing, and an open position where the front and top ends of the housing are substantially open to provide access into the housing.

According to yet another embodiment of the invention, a generator includes a frame having a base, two sidewalls extending from the base, a back wall extending from the base, and a front portion along the front of the base, wherein the front portion and the sidewalls define a front opening into the generator, the back wall and the sidewalls define a top opening into the generator, the back wall has a height greater than that of the front portion and each sidewall has a back height substantially similar to that of the back wall and a front height mating to the front portion of the frame, and a top edge of each sidewall extends downward from the back height of the respective sidewall to the front height of the respective sidewall. The generator also includes a prime mover and an alternator mounted within the frame. The generator further includes first and second doors rotatively coupled to a respective sidewall to rotate over a top of the respective sidewall between a closed position to substantially cover the top and front openings and an open position to provide access into the generator through the top and front openings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An enclosure for a standby generator comprising:
    a frame having:
        a base for supporting an engine and an alternator driven by the engine;
        a back wall extending generally vertically from the base; and
        first and second sidewalls extending generally vertically from the base and connected to the back wall at opposite ends of the enclosure, the first and second sidewall each having a top edge, generally sloping downward from the back wall forward; and
    first and second doors, each respectively attached to the first and second sidewalls of the frame such that each pivots about the top edge of the first and second sidewalls.

2. The enclosure for a standby generator of claim 1, further comprising at least one hinge positioned about the top edge of the first and second sidewalls connecting each of the first and second doors to the first and second sidewalls.

3. The enclosure for a standby generator of claim 1, wherein the first and second doors together substantially covers the frame.

4. The enclosure for a standby generator of claim 1, wherein an edge of each of the first and second doors adjacent a respective first and second sidewall is one of a straight edge and generally a z-shaped edge.

5. The enclosure for a standby generator of claim 1, wherein the top edge of the first and second sidewalls extends substantially from an upper back corner of the enclosure, mating to a top edge of the back wall, to a lower front corner of the enclosure wherein the lower front corner is at least half the height of that of the upper back corner.

6. The enclosure for a standby generator of claim 1, wherein the first and second doors are coupled to a respective sidewall with hinges and rotate about an axis substantially parallel to the forward sloping top edge of the respective sidewall.

7. The enclosure for a standby generator of claim 1, further comprising at least one door stop to hold the first and second doors in a desired position when open to provide unhindered access within the enclosure.

8. The enclosure for a standby generator of claim 1, further comprising first and second partition walls each mounted to the base and extending from the back wall to the front of the enclosure and from the base to the first and second doors to create a multi-chamber generator enclosure.

9. The enclosure for a standby generator of claim 8, wherein the first and second doors each comprise a side portion, a front portion, and a top portion; and
    wherein the front portions and the top portions provide respectively a front and top of the enclosure.

10. The enclosure for a standby generator of claim 9, wherein the first and second doors each comprise apertures in the side portions to allow air to flow between the enclosure and the environment, and wherein the first and second partition walls each comprise apertures therein to allow air to flow between chambers of the multi-chamber generator enclosure.

11. The enclosure for a standby generator of claim 9, wherein each side portion is rotatively coupled to a different one of the first and second sidewalls along the forward sloping top edge such that the first and second doors rotate between a closed position to cover the top and front of the enclosure and an open position to provide access into the enclosure through the top and front of the enclosure.

12. The enclosure for a standby generator of claim 1, further comprising a support arm extending from the back wall of the frame over a top and front of the enclosure to the base to support the first and second doors in a closed position.

13. The enclosure for a standby generator of claim 12, wherein the support arm includes a channel to direct water away from an interior of the generator.

14. A standby generator comprising:
    a multi-chamber generator housing having a base, a back wall, a first and second sidewall at a respective first end and second end of the housing, and a first and second partition wall each extending from the back wall to the front of the housing to create respective chambers, both partition walls having at least one aperture for air to flow between the respective chambers;
    an internal combustion engine and an alternator driven by the internal combustion engine mounted in the housing between the first and second partition walls; and
    a first and second hood each rotatively coupled to a different one of the first and second sidewall such that the first and second hoods rotate between a closed position to substantially cover front and top ends of the housing, and an open position where the front and top ends of the housing are substantially open to provide access into the housing.

15. The standby generator of claim 14, wherein the first and second hoods close on the first and second partition walls to create an airflow arrangement wherein cooling air is drawn into the housing through a vent in the first end, directed through the apertures in the first and second partition wall to pass between the respective chambers, and expelled through a vent in the second end of the housing.

16. The standby generator of claim 14, further comprising a support member extending from the back wall over the top end and front end of the housing to support the first and second hood in the closed position.

17. The standby generator of claim 14, wherein the support member comprises a gutter to direct water off the housing and one or more rain seals to seal between the gutter and the first and second hood.

18. The standby generator of claim 14 further comprising an engine exhaust heat management system comprising a heat duct surrounding an exahust and an air flow actuator to direct air flow through the heat duct.

19. The standby generator of claim 18, wherein the air flow actuator includes at least one of an engine fan and an alternator fan and drives the air over the engine and out of the chamber having the engine through a second aperture in the second partition wall.

20. The standby generator of claim 14, wherein the first and second sidewalls each have a top edge extending downward toward the front of the housing; and
wherein the first and second hoods are coupled to hinge upon a respective side wall along the top edge.

21. A generator comprising:
a frame having:
   a base;
   two sidewalls extending from the base;
   a back wall extending from the base; and
   a front portion along the front of the base;
   wherein the front portion and the sidewalls define a front opening into the generator, the back wall and the sidewalls define a top opening into the generator, the back wall has a height greater than that of the front portion and each sidewall has a back height substantially similar to that of the back wall and a front height mating to the front portion of the frame, and a top edge of each sidewall extends downward from the back height of the respective sidewall to the front height of the respective sidewall;
a prime mover and an alternator mounted within the frame; and
first and second doors rotatively coupled to a respective sidewall to rotate over a top of the respective sidewall between a closed position to substantially cover the top and front openings and an open position to provide access into the generator through the top and front openings.

22. The generator of claim 21, wherein the frame and doors provide an enclosure for a standby generator that is resistant to rain water.

23. The generator of claim 21, wherein each of the first and second doors have:
   a side panel;
   a top panel; and
   a front panel;
   wherein the top panels and front panels extend from the side panel of a respective door, and the side panels are hingedly coupled to the respective sidewall.

24. The generator of claim 21, further comprising a door support extending across the top and front openings to support the first door and second door in the closed position.

25. The generator of claim 24, wherein the door support comprises a rain gutter positioned between the first door and second door when in the closed position.

* * * * *